(12) United States Patent
Ojo et al.

(10) Patent No.: US 7,034,892 B2
(45) Date of Patent: Apr. 25, 2006

(54) SPATIO-TEMPORAL FILTER UNIT AND IMAGE DISPLAY APPARATUS COMPRISING SUCH A SPATIO-TEMPORAL FILTER UNIT

(75) Inventors: Olukayode Anthony Ojo, Eindhoven (NL); Tatiana Georgieva Kwaaitaal-Spassova, Eindhoven (NL); Rudolf Eland, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 622 days.

(21) Appl. No.: 10/055,390

(22) Filed: Jan. 23, 2002

(65) Prior Publication Data

US 2002/0101543 A1    Aug. 1, 2002

(30) Foreign Application Priority Data

Jan. 26, 2001    (EP) ................................. 01200294

(51) Int. Cl.
   *H04N 5/213*    (2006.01)
(52) U.S. Cl. ...................... 348/607; 348/624; 348/718; 382/260; 382/261; 382/265
(58) Field of Classification Search ................ 348/607, 348/618–624, 627–629, 718, 720–721; 382/260–261, 382/265, 275, 205, 308; H04N 5/213
   See application file for complete search history.

(56) References Cited

U.S. PATENT DOCUMENTS 5,260,791 A * 11/1993 Lubin .......................... 348/623
5,500,685 A *  3/1996 Kokaram ..................... 348/620
5,512,956 A *  4/1996 Yan ............................. 348/606
5,903,680 A *  5/1999 De Haan et al. ............. 382/265
6,239,847 B1 *  5/2001 Deierling .................... 348/581
6,310,982 B1 * 10/2001 Allred et al. ................ 382/260
6,529,637 B1 *  3/2003 Cooper ........................ 382/267
6,573,946 B1 *  6/2003 Gryskiewicz ............... 348/600
6,633,683 B1 * 10/2003 Dinh et al. .................. 382/260

(Continued)

FOREIGN PATENT DOCUMENTS

EP    0601655 A1    12/1993

OTHER PUBLICATIONS

"Memory Integrated Noise Reduction IC for Television", G. de Haan et al., IEEE Transactions on Consumer Electronics, vol. 42, No. 2, May 1996, pp. 175-181.*

*Primary Examiner*—Brian P. Yenke
(74) *Attorney, Agent, or Firm*—Edward W. Goodman

(57) ABSTRACT

Noise reduction is an important feature in consumer television. This is realized by spatial, temporal or spatio-temporal filters. Spatial filters require pixels from within one image, while temporal filters require samples from two or more successive images. The spatio-temporal filter unit (100) integrates spatial and implicit motion-compensated temporal noise reduction in one filter. For the motion compensation, no motion vectors are required. The spatio-temporal filter unit (100) is provided with a sigma filter (112) having one filter kernel (107) designed to operate on the pixels from both a current image and from the output of the spatio-temporal filter unit, being a temporally recursive filtered image. The operation of the spatio-temporal filter unit (100) can be adjusted by varying the thresholds of the sigma filter (112) and the selection of pixels. The adjustments can be controlled by a motion estimator (222), a motion detector (224) and a noise estimator (220).

9 Claims, 3 Drawing Sheets

U.S. PATENT DOCUMENTS 6,657,676 B1 * 12/2003 Borneo et al. .............. 348/607
6,788,823 B1 * 9/2004 Allred et al. ............... 382/260
6,819,804 B1 * 11/2004 Tenze et al. ................ 382/262
2002/0118887 A1 * 8/2002 Gindele ...................... 382/260

* cited by examiner

SPATIO-TEMPORAL FILTER UNIT AND IMAGE DISPLAY APPARATUS COMPRISING SUCH A SPATIO-TEMPORAL FILTER UNIT

BACKGROUND OF THE INVENTION

1. Field of the Invention

The invention relates to a spatio-temporal filter unit, provided with a sigma filter, to reduce the noise in images.

The invention further relates to an image display apparatus comprising such a spatio-temporal filter unit.

2. Description of the Related Art

A unit of the kind described in the opening paragraph is known from G. de Haan et al, "Memory integrated noise reduction for television," in IEEE Transactions on Consumer Electronics, Vol. 42, No 2, May 1996, Pages 175–181. In this article, a unit is described which is a cascaded system of two filters, i.e., a spatial filter and a temporal filter. The spatial and temporal filters together should result in effective noise reduction. In general, spatial filters require pixels from one image, while temporal filters require samples from two or more successive images.

The spatial filter is a recursive sigma filter. It is based on a variant of the sigma nearest neighbors selection process. The combination process involves weighted averaging, which is optimal for additive white Gaussian noise. The weights of the described sigma filter can have three possible values, which are selected based on thresholds that are adapted to the noise level. In the article, also a noise estimator is described to estimate the noise level.

The temporal filter is realized as a motion-compensated first-order temporal recursive filter. Therefore, this temporal filter requires a motion estimation and motion compensation system, which makes the concept expensive. Furthermore, a motion detection means is necessary to adapt the strength of the filtering when motion occurs. Otherwise, the image is distorted.

SUMMARY OF THE INVENTION

It is a first object of the invention to provide a spatio-temporal filter unit, of the kind described in the opening paragraph, that integrates spatial and implicit motion-compensated temporal noise reduction in one filter. For the motion compensation, no motion vectors, or other means to express the amount and direction of movement, are required.

It is a second object of the invention to provide an image display apparatus comprising such a spatio-temporal filter unit.

The first object of the invention is achieved in that the spatio-temporal filter unit comprises one filter kernel designed to operate on pixels from both a current image and from the output of the spatio-temporal filter unit, being a temporally recursive filtered image. The filtering is based on the sigma nearest neighbors selection. Pixels that have poor correlation with the original pixel are automatically discarded, whereas other pixels contribute to the output in proportion to their correlation. It involves weighted averaging of selected pixels from a predefined 3-dimensional window comprising horizontal, vertical and temporal directions. A major characteristic of this spatio-temporal filter unit is that the spatial and temporal filtering are done within the same filter kernel. This reduces the implementation cost significantly and leads to an easily optimized concept. Moreover, problems, such as the so-called "dirty-window" effect or frozen noise, "comet tails," etc., are automatically solved since the temporal filter is no longer separable. Noise breakthrough at edges or around moving objects is also eliminated because the spatial and temporal filters complement each other.

An embodiment of the spatio-temporal filter unit according to the invention comprises:

a spatial pixel buffer for storing pixels of the current image;

a spatial pixel selector for selecting pixels from the spatial pixel buffer;

a temporal pixel buffer for buffering pixels from the output of the spatio-temporal filter unit, said output being a temporally recursive filtered image;

a temporal pixel selector for selecting pixels from the temporal pixel buffer; and the sigma filter comprising one filter kernel designed to operate on the pixels from both the spatial pixel selector and the temporal pixel selector.

In the spatial pixel buffer, a 2-dimensional spatial pixel selector is defined to select pixels to enable spatial filtering. In order to add temporally recursive filtered pixels in the filter kernel of the sigma filter, a second 2-dimensional temporal pixel selector is defined in the temporal pixel buffer, which is filled with pixels taken from a picture memory. In this way, 3-dimensional spatio-temporal filtering is realized within one filter aperture. The output of the sigma filter is stored in a picture memory and used for subsequent filtering. This is the temporal recursive part of the processing. Motion detection is inherent in the filtering. Each pixel is first compared with the original one to determine its contribution to the output. Where motion occurs, the pixel will have a large difference in gray value. Therefore, it will be automatically discarded. Furthermore, motion compensation is also inherent. This is realized by using a temporal pixel selector for the selection of the temporally recursive filtered pixels and a discriminating averaging filter, which uses a threshold. If there is no motion, the gray level correlation relative to the central input pixel is high around the central pixel of the previous image. When motion occurs, this correlation is shifted in position automatically following the motion trajectory. Provided the motion is low enough, temporal filtering will take place because correlated pixels can be found somewhere within the temporal window, i.e., the temporal pixel selector. In other words, motion compensation is implicitly done, thereby making explicit motion compensation redundant.

An embodiment of the spatio-temporal filter unit according to the invention comprises an adaptive sigma filter. The filter thresholds of the sigma filter are adjustable. That means the degree of filtering can be increased or decreased to suit the taste of the user of this embodiment of the spatio-temporal filter unit, or of an image display apparatus comprising such a spatio-temporal filter unit. The thresholds for spatial and temporal filtering can be independently determined so that the desired balance between spatial and temporal filtering is achieved.

An embodiment of the spatio-temporal filter unit according to the invention is characterized in that of at least one of the pixel selectors, being the temporal pixel selector and the spatial pixel selector, the aperture can be adjusted. This determines the strength of the filtering and the characteristics of the output. A combination of a narrow aperture and a large aperture with image alternation gives good results.

An embodiment of the spatio-temporal filter unit according to the invention is characterized in that at least one of the pixel selectors, being the temporal pixel selector and the spatial pixel selector, is designed such that the distance between the selected pixels is adjustable. The result is that the aperture of the selector can be adjusted while keeping the number of selected pixels more or less constant. The costs of the pixel selectors are based on their storage capacity, i.e., the number of pixels they can store simultaneously. The advantage of this embodiment according to the invention is that the costs for processing of the pixels can be relatively low.

An embodiment of the spatio-temporal filter unit according to the invention comprises a motion detector designed to detect motion and to control the aperture of the temporal pixel selector based on detected motion. The aperture determines the strength of the filtering for still images and the range of the motion compensation for moving sequences. An advantage of such an embodiment is that the implicit motion compensation is optimized. The motion detector may detect global or local motion. As the aperture can be determined on a field basis, an optimal setting can be found for each sequence once the degree of motion activity is known. The detector does not have to provide information about the direction of movement. It is also possible that an external motion estimator provides information about the estimated motion.

An embodiment of the spatio-temporal filter unit according to the invention comprises a motion estimator designed to supply motion vectors and to control the position of the temporal pixel selector related to the temporal pixel buffer, based on the motion vectors supplied by the motion estimator. The advantage of such an embodiment is that the temporal proximity is increased. This is especially beneficial in the case of high object velocities. It is also possible that an external motion estimator provides the motion vectors.

An embodiment of the spatio-temporal filter unit according to the invention comprises a noise estimator designed to estimate a noise level in the current image and to control the aperture of at least one of the pixel selectors, being the temporal pixel selector and the spatial pixel selector, based on the estimated noise level. As noted previously, the strength of filtering is related to the aperture of the pixel selectors. Relatively more filtering is allowed in case of a relatively high estimated noise level. Therefore, optimal noise filtering is achieved at all noise levels. It is also possible that an external noise estimator provides the estimated noise level.

An embodiment of the spatio-temporal filter unit according to the invention comprises a noise estimator designed to estimate a noise level in the current image and to control thresholds of the adaptive sigma filter based on the estimated noise level. The thresholds can be increased in case of a relatively high estimated noise level and decreased in case of a relatively low estimated noise level. Therefore, optimal noise filtering is achieved at all noise levels.

BRIEF DESCRIPTION OF THE DRAWINGS

These and other aspects of the spatio-temporal filter unit and the image display apparatus according to the invention will become apparent from and will be elucidated with reference with respect to the implementations and embodiments described hereinafter and with reference to the accompanying drawings, wherein.

DESCRIPTION OF THE PREFERRED EMBODIMENTS

Figure 1:
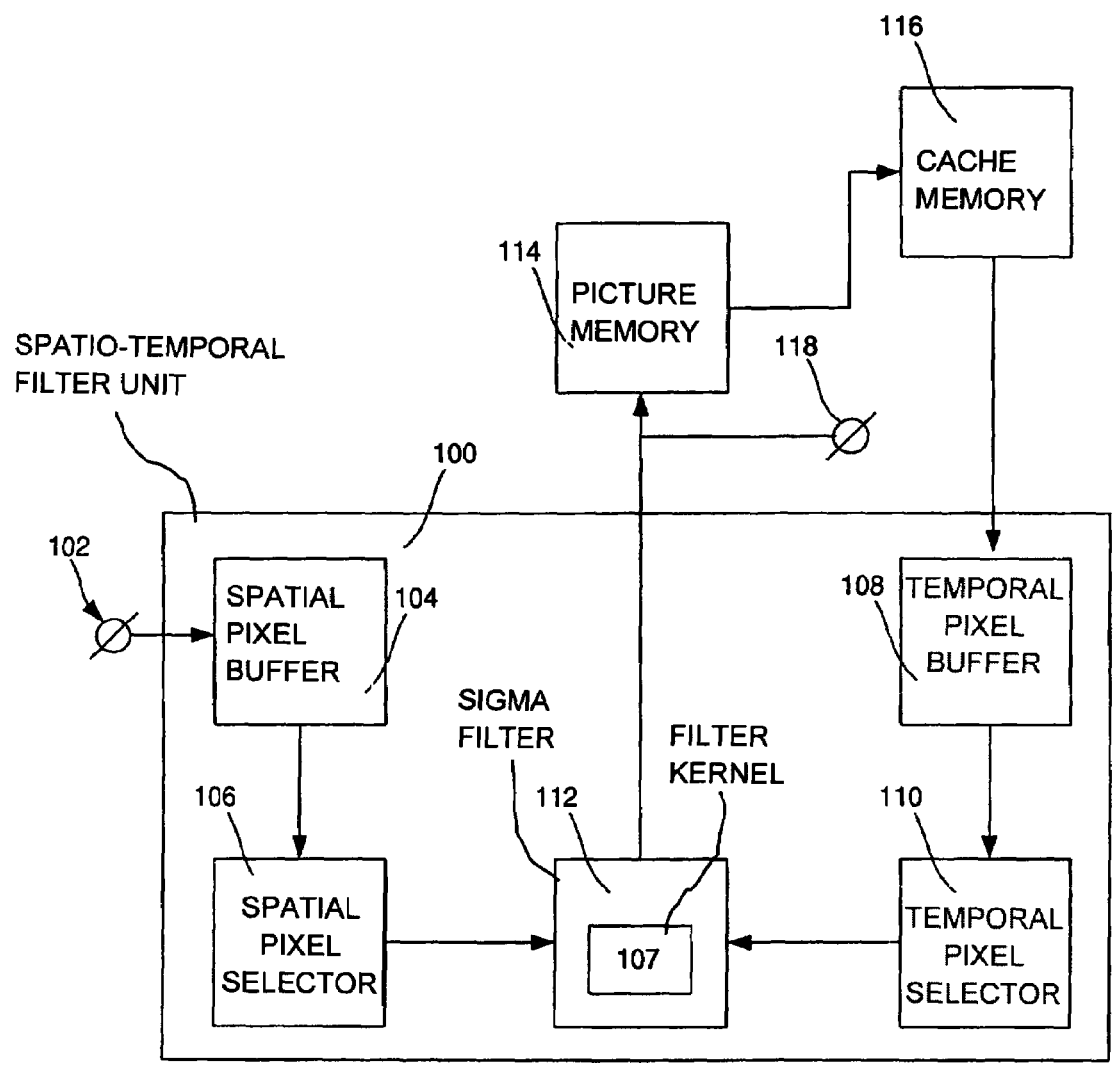
FIG. 1 schematically shows an embodiment of a spatio-temporal filter unit.

FIG. 1 schematically shows an embodiment of a spatio-temporal filter unit 100 and two memory units which are used by the spatio-temporal filter unit 100. These memory units might be shared with other units in a system comprising the spatio-temporal filter unit 100. The first memory unit is a picture memory 114 for storing the output of the spatio-temporal filter unit, being a temporally recursive filtered image. The second memory unit is a cache 116. The signal representing the images enters the spatio-temporal filter unit 100 at the connection 102. The filtered signal leaves the spatio-temporal filter unit 100 at the connection 118. Pixels from this filtered signal are also stored in the picture memory 114. Pixels from an image that enter the spatio-temporal filter unit 100 are buffered in the spatial pixel buffer 104. The spatial pixel selector 106 selects pixels from the spatial pixel buffer 104 and provides these selected pixels to the filter kernel 107 of the sigma filter 112. Pixels from the picture memory 114 are cached in the cache 116 for reasons of performance. From the cache 116, pixels are buffered in the temporal pixel buffer 108. The temporal pixel selector 110 selects pixels from the temporal pixel buffer 108 and also provides these selected pixels to the filter kernel 107 of the sigma filter 112. In this way, the filter kernel 107 operates on the pixels from both the spatial pixel selector 106 and the temporal pixel selector 110.

Figure 2:
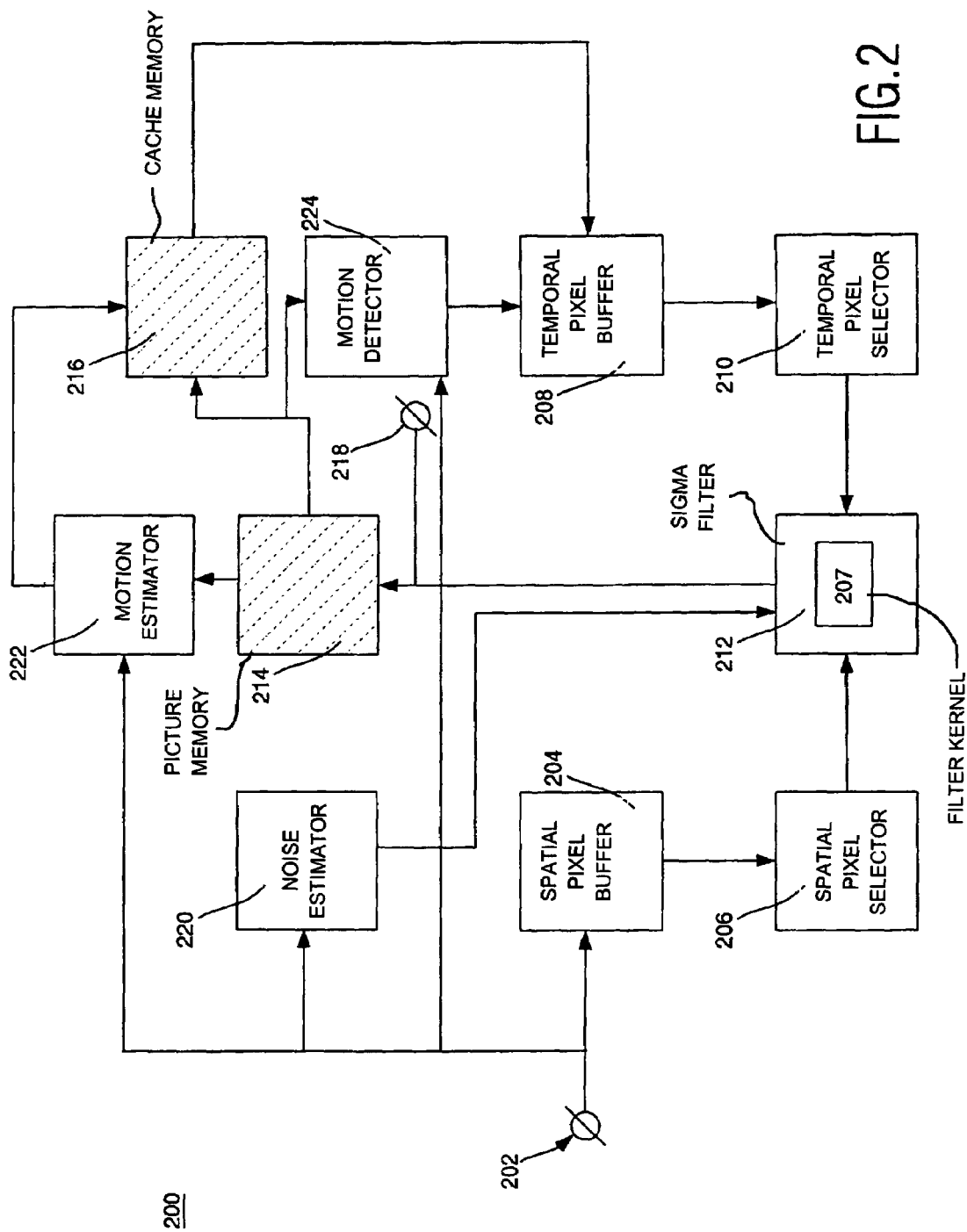
FIG. 2 schematically shows an embodiment of a spatio-temporal filter unit comprising a noise estimator, a motion estimator and a motion detector.

FIG. 2 schematically shows a relatively more sophisticated embodiment of a spatio-temporal filter 200. The white boxes in FIG. 2 are part of the spatio-temporal filter 200. The shaded boxes in FIG. 2 are not part of the spatio-temporal filter 200. These shaded boxes represent memory units. These might be shared with other units in a system comprising the spatio-temporal filter unit 200. The first memory unit is a picture memory 214 for storing the output of the spatio-temporal filter unit, being a temporally recursive filtered image. The second memory unit is a cache 216. The signal representing the images enters the spatio-temporal filter unit 200 at the connection 202. The filtered signal leaves the spatio-temporal filter unit 200 at the connection 218. Pixels from this filtered signal are also stored in the picture memory 214. Pixels from an image that enters the spatio-temporal filter unit 200 are buffered in the spatial pixel buffer 204. The spatial pixel selector 206 selects pixels from the spatial pixel buffer 204 and provides these selected pixels to the filter kernel 207 of the sigma filter 212. Pixels from the picture memory 214 are cached in the cache 216 for reasons of performance. From the cache 216, pixels are buffered in the temporal pixel buffer 208. The temporal pixel selector 210 selects pixels from the temporal pixel buffer 208 and also provides these selected pixels to the filter kernel 207 of the sigma filter 212. In this way, the filter kernel 207 operates on the pixels from both the spatial pixel selector 206 and the temporal pixel selector 210. The spatio-temporal filter 200 comprises a motion detector 224 designed to detect motion and to control the aperture of the temporal pixel selector 210 based on detected motion. The spatio-temporal filter 200 further comprises a motion estimator 222 designed to supply motion vectors and to control the position of the temporal pixel selector 210 related to the temporal pixel buffer 208, based on the motion vectors supplied by the motion estimator. The spatio-temporal filter 200 also comprises a noise estimator 220 for estimating a noise level in the current image and for controlling the aperture of at least one of the pixel selectors, being the temporal pixel selector 210 and the spatial pixel selector 206, based on the estimated noise level. In addition, the noise estimator 220 controls thresholds of the adaptive sigma filter 212, based on the estimated noise level.

Figure 3:
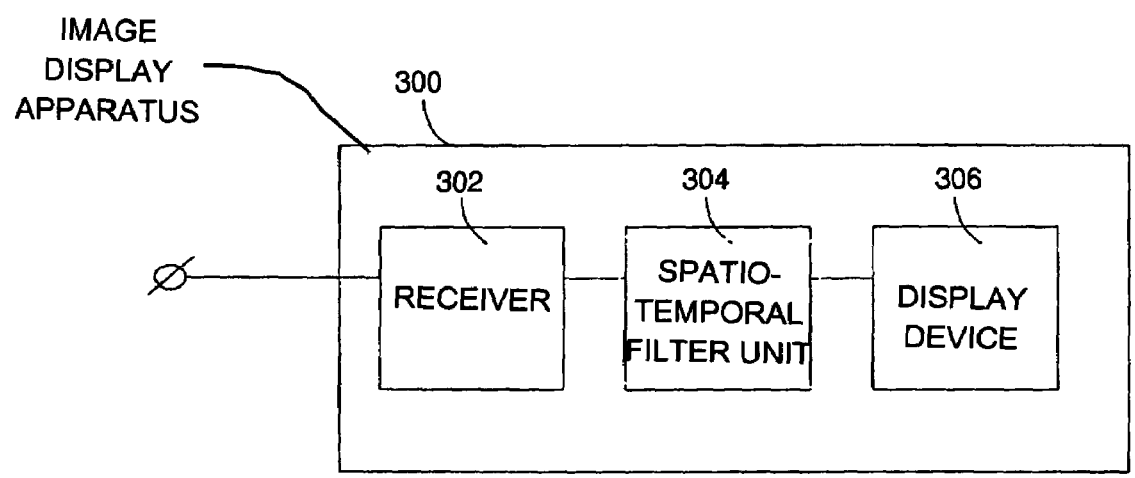
FIG. 3 shows elements of an image display apparatus.

FIG. 3 shows elements of an image display apparatus 300 according to the invention. The image display apparatus 300 has a receiving means 302 for receiving a video signal representing the images to be displayed. The signal may be a broadcast signal received via an antenna or cable, but may also be a signal from a storage device, like a VCR (Video Cassette Recorder) or DVD (Digital Versatile Disk). The image display apparatus 300 further has a spatio-temporal filter unit 304 for filtering the video signal and a display device 306 for displaying the images represented by the filtered video signal. The spatio-temporal filter unit 304 is implemented as described in FIG. 1 or FIG. 2.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps other than those listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

The invention claimed is:

1. A spatio-temporal filter unit comprising a sigma filter for reducing noise in images, characterized in that the sigma filter comprises one filter kernel for operating on pixels from both a current image and from an output of the spatio-temporal filter unit, said output supplying a temporally recursive filtered image, characterized in that said spatio-temporal filter unit further comprises:
   a spatial pixel buffer for storing pixels of the current image as supplied to the spatio-temporal filter unit;
   a spatial pixel selector for selecting pixels from the spatial pixel buffer;
   a temporal pixel buffer for buffering pixels from the output of the spatio-temporal filter unit; and
   a temporal pixel selector for selecting pixels from the temporal pixel buffer,
wherein the sigma filter is coupled to an output of said spatial pixel selector and to an output of said temporal pixel selection, said one filter kernel operating on the pixels from both the spatial pixel selector and the temporal pixel selector.

2. The spatio-temporal filter unit as claimed in claim 1, characterized in that the sigma filter comprises an adaptive sigma filter.

3. The spatio-temporal filter unit as claimed in claim 2, characterized in that an aperture of at least one of the temporal pixel selector and the spatial pixel selector is adjustable.

4. The spatio-temporal filter unit as claimed in claim 3, characterized in that at least one of the temporal pixel selector and the spatial pixel selector is designed such that a distance between the selected pixels is adjustable.

5. The spatio-temporal filter unit as claimed in claim 3, characterized in that said spatio-temporal filter unit further comprises a motion detector for detecting motion, said motion detector controlling the aperture of the temporal pixel selector based on the detected motion.

6. The spatio-temporal filter unit as claimed in claim 3, characterized in that said spatio-temporal filter unit further comprises a motion estimator for supplying motion vectors, said motion estimator controlling a position of the temporal pixel selector relative to the temporal pixel buffer based on the motion vectors.

7. The spatio-temporal filter unit as claimed in claim 3, characterized in that said spatio-temporal filter unit further comprises a noise estimator for estimating a noise level in the current image, said noise estimator controlling the aperture of at least one of the temporal pixel selector and the spatial pixel selector based on the estimated noise level.

8. The spatio-temporal filter unit as claimed in claim 3, characterized in that said spatio-temporal filter unit further comprises a noise estimator for estimating a noise level in the current image, said noise estimator controlling thresholds of the adaptive sigma filter based on the estimated noise level.

9. An image display apparatus comprising;
   receiving means for receiving a signal representing images;
   a display device for displaying the images; and
   a spatio-temporal filter unit comprising a sigma filter for reducing in the images, characterized in that said spatio-temporal filter unit further comprises:
   a spatial pixel buffer for storing pixels of a current image as supplied to the spatio-temporal filter unit;
   a spatial pixel selector for selecting pixels from the spatial pixel buffer;
   a temporal pixel buffer for buffering pixels from the output of the spatio-temporal filter unit, said output supplying a temporally recursive filtered image; and
   a temporal pixel selector for selecting pixels from the temporal pixel buffer,
wherein the sigma filter is an adaptive sigma filter and is coupled to an output of said spatial pixel selector and an output of said temporal pixel selector, said sigma filter comprising one filter kernel for operating on the pixels from both the spatial pixel selector and the temporal pixel selector.

* * * * *